(12) United States Patent
Naya et al.

(10) Patent No.: US 7,916,926 B2
(45) Date of Patent: Mar. 29, 2011

(54) SEMICONDUCTOR INSPECTION APPARATUS

(75) Inventors: Hidemitsu Naya, Chiyoda-ku (JP);
Takuya Shirato, Hitachinaka (JP);
Akira Karakama, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 926 days.

(21) Appl. No.: 11/482,089

(22) Filed: Jul. 7, 2006

(65) Prior Publication Data

US 2007/0024643 A1 Feb. 1, 2007

(30) Foreign Application Priority Data

Jul. 8, 2005 (JP) .................. 2005-200668

(51) Int. Cl.
*G09G 5/00* (2006.01)
(52) U.S. Cl. .................. 382/141; 345/156; 345/960
(58) Field of Classification Search .................. 382/141; 345/629, 501, 960, 156, 473; 250/310, 307; 324/751
See application file for complete search history.

(56) References Cited

U.S. PATENT DOCUMENTS

| 5,502,306 | A | * | 3/1996 | Meisburger et al. | 250/310 |
| 7,049,585 | B2 | * | 5/2006 | Nakasuji et al. | 250/310 |
| 7,135,676 | B2 | * | 11/2006 | Nakasuji et al. | 250/310 |
| 7,365,322 | B2 | * | 4/2008 | Miyamoto et al. | 250/310 |
| 7,496,211 | B2 | * | 2/2009 | Yamagami et al. | 382/103 |
| 2004/0002829 | A1 | | 1/2004 | Iguchi et al. | |
| 2007/0206831 | A1 | * | 9/2007 | Matsuno et al. | 382/100 |

FOREIGN PATENT DOCUMENTS

| JP | 06-124678 | 5/1994 |
| JP | 6-324662 A | 11/1994 |
| JP | 08-331551 | 12/1996 |
| JP | 2000-123770 | 4/2000 |
| JP | 2000-164666 | 6/2000 |
| JP | 2003-203594 A | 7/2003 |
| JP | 2004-006219 | 1/2004 |
| JP | 2004-72093 | 4/2004 |

OTHER PUBLICATIONS

Office Action dated Dec. 8, 2009 in Japanese Patent Application No. 2005-200668.
Office Action in Japanese Patent Application No. 2005-200668 dated Mar. 16, 2010.

* cited by examiner

*Primary Examiner* — Sheela C Chawan
(74) *Attorney, Agent, or Firm* — Crowell & Moring LLP

(57) ABSTRACT

An inspected image can be communicated without putting large load on a network. A remote console enables an operation screen and a moving image to be displayed and processed without color shifts. Information on the operation screen is not communicated as bitmap information, but event information such as a formation of a window and the moving of a mouse is communicated as information at a level of I parts of graphical user interface. Moreover, communication of the event information on the operation screen and communication of a moving image are separated. In addition, a method of compressing information on the operation screen and a method of compressing information on the moving image are separated. A necessary part of information on the moving image is selected and communicated depending on the state of the semiconductor inspection apparatus, an operation of an operator, and a pattern to be inspected.

4 Claims, 18 Drawing Sheets

SEMICONDUCTOR INSPECTION APPARATUS

CLAIM OF PRIORITY

The present application claims priority from Japanese application JP 2005-200668 filed on Jul. 8, 2005, the content of which is hereby incorporated by reference into this application.

BACKGROUND OF THE INVENTION

1. Field of the Invention

The present invention relates to a semiconductor inspection apparatus.

2. Description of the Related Art

As a hardware which allows achieving a remote operation, a product called KVM switch for extending a cable for a keyboard, a display or a mouse cable is available on the market. On the other hand, as a method for achieving a remote operation by software, software shown in Non-patent Reference Documents 2 and 3 are available. A Patent Document 1 describes the displaying of moving images having an image quality which is suitable for a scanning method by providing a displaying device exclusively used for moving images which will serve as a monitored image at a terminal for remote operation to change a compression method depending on a scanning method. Patent Document 2 describes modification of an image quality of each of moving images depending on a degree of interest, in an environment in which a plurality of moving images are displayed.

Patent Document 1: Japanese Unexamined Patent Application Publication No. 2003-203594

Patent Document 2: Japanese Unexamined Patent Application Publication No. Hei 6-324662

Non-patent Document 1: Proceeding of SPIE Vol. #5752-53 "New matching engine between designed pattern layout and SEM image of semiconductor device"

Non-patent Document 2: "Introduction to Virtual Network Computing-Beyond the barrier of OS" ISBN: 48778300030

Non-patent Document 3: "Detailed description of VNC-Heterogeneous OS-Corresponding Graphical User Interface and RFB Protocol" ISBN: 478981856X

SUMMARY OF THE INVENTION

The KVM switch requires the laying of an extension cable for dedicated use thereof. An increase of the length of the cable raises problems, such as a color blur and the like. For achievement of the remote control by means of software as shown in Non-patent Documents 2 and 3, the updating of a screen page is dealt with as bitmap information, thus, an amount of transferred data is increased. Also, a countermeasure has not been able to be taken in the case where a high speed drawing like a moving image is carried out to update the screen page in real time. The method according to the Patent Document 1 does not make it possible that a computer screen and the moving image are combined and displayed using a display device connected with a computer. Additionally, the connection by means of a dedicated line is focused on, and therefore, the band of communication path is not taken into consideration because a compression ratio depends on a semiconductor inspection apparatus. Therefore, in a common line such as a network, a large amount of the band is consumed. Accordingly, there is a high possibility for other devices to be adversely influenced. The method according to the Patent Document 2 does not make it possible that an image quality is changed depending on the degree of interest in an arbitrary area in the inside of the moving image.

Furthermore, a conventional apparatus memorizes as log error information and the status of the apparatus, such as a time period elapsed from a time of power-on, process result, and processing time. However, the content of the log shows a mere result, and it takes very long period time to analyze the causes. Particularly, it is very difficult to analogize a series of operations carried out by an operator from the log.

It is an object of the present invention to provide a semiconductor inspection apparatus, which can communicate an inspected image without heavy load on a network, and which displays and processes an operation screen and an image without color shifts by a remote console. In addition, it is another object to provide a semiconductor inspection apparatus which facilitates analysis of a series of operations carried out by an operation.

To achieve the purpose above, in the present invention, information about an operation screen is not communicated as bitmap information, but event information at widget level, such as formation of a window and the moving of a mouse, is communicated as information at I part level (widget) of a graphical user interface. Also, communication of the event information about the operation screen and communication of an image are divided, and compression methods are separated between of information about the operation screen and of image information.

Moreover, only necessary parts of the image information are selected to be communicated depending on the state of the semiconductor inspection apparatus, the operation by the operator, a pattern to be inspected.

The event information about a series of operations, such as a click of a button on the screen, the moving of a slider, and key input, which are carried out by the operator, is also memorized as a log.

The present invention is generally applicable to apparatus, which has a graphical user interface, and which is operated on the images.

The present invention achieves the displaying and the processing of the operation screen and the image by means of the remote console by separately achieving the communication of the event information about the operation screen and the communication of the image. Additionally, the traffic of a network can be reduced by communicating the information in an arbitrary area of the image according to a method of using apparatus. Furthermore, the relationship between the operation and the state of the apparatus becomes clear by memorizing as the log the events of the operation by the operator. Thus, analysis of a failure is facilitated.

BRIEF DESCRIPTION OF THE DRAWINGS

FIG. 3 is used to describe an example in which information on graphical user interface and information on moving image are separately dealt with.

DETAILED DESCRIPTION OF THE PREFERRED EMBODIMENTS

Figure 1:
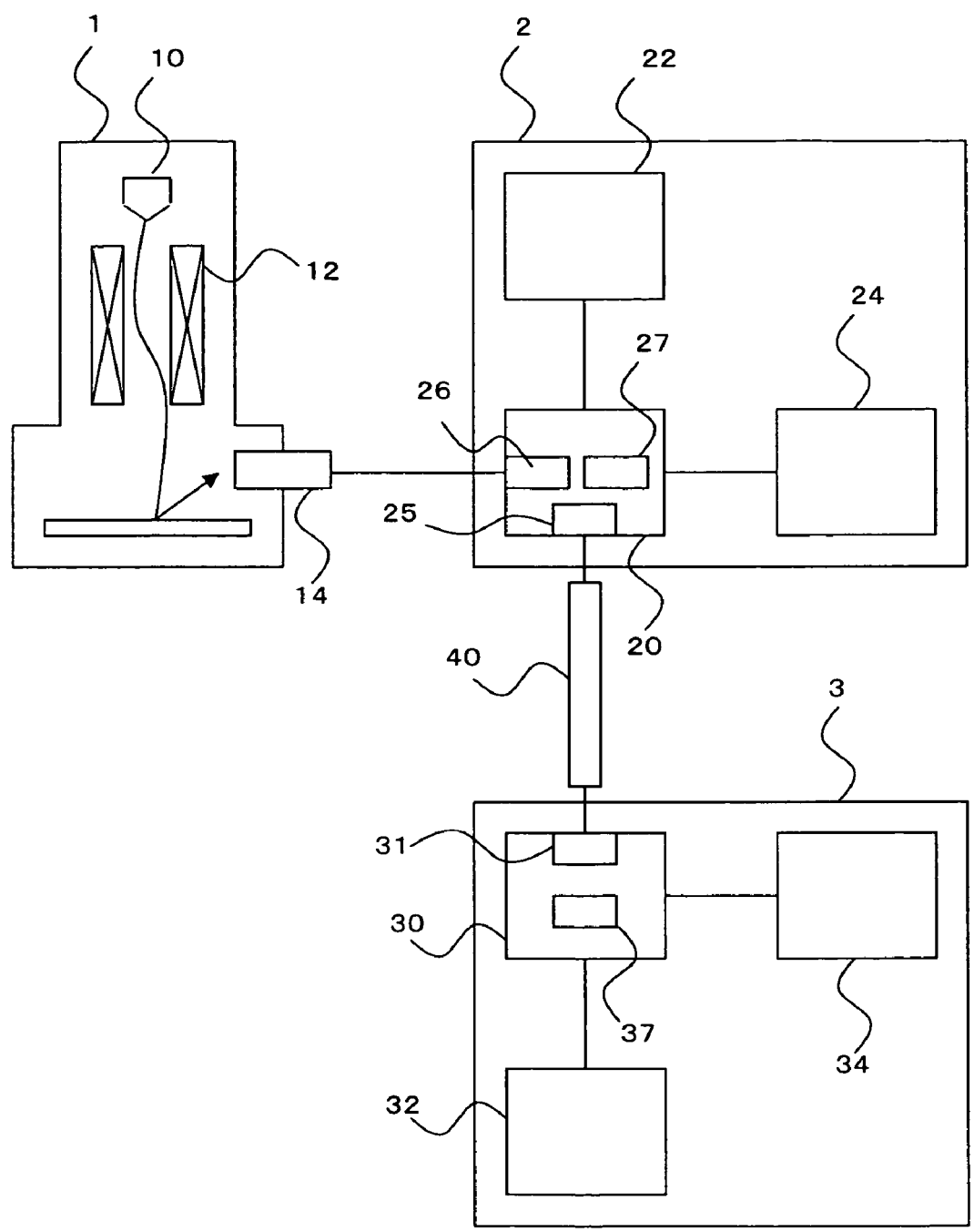
FIG. 1 shows an example of a configuration of a semiconductor inspection apparatus.

FIG. 1 is a schematic view showing an example of a configuration of a semiconductor inspection apparatus according to the present invention. The semiconductor inspection apparatus is provided with an electronic microscope body 1, a control console 2, and a remote console 3. The electronic microscope 1 includes an electron source 10, an electronic beam deflector 12, and an electronic detector 14.

The control console 2 includes a computer 20. The computer 20 includes an image receiving function 26 for receiving a moving image which is an output of the electronic detector 14, a moving image processing function 27, and a communication function 25. The computer 20 is connected with a display 22 and also with an operation panel 24. The computer 20 is here referred to as PC. The image receiving function 26 can be achieved by mounting an expansion board for a capture. Alternatively, it is also possible to use a universal input I/F, such as USB generally mounted on a PC. Furthermore, the operation panel 24 can be achieved by being connected with the universal input I/F such as USB and the like. The moving image processing function 27 of processing the moving image, which is used to carry out conversion, compression, and decompression of the received image, can be achieved by either of hardware or software.

The remote console 3 is provided with at least a computer 30. The computer 30 is connected with a display 32, and also with an operation pane 34. The computer 30 has a communication function 31. A communication path 40 makes connection between the control console 2 and the remote console 3. The computer 30 has a moving image processing function 37. The moving image processing function 37 is used to carry out conversion, compression, and decompression of the received image, can be achieved by either of hardware or software. In FIG. 1, one remote console 3 is used, but the number of the remote console used is not limited.

Figure 2:
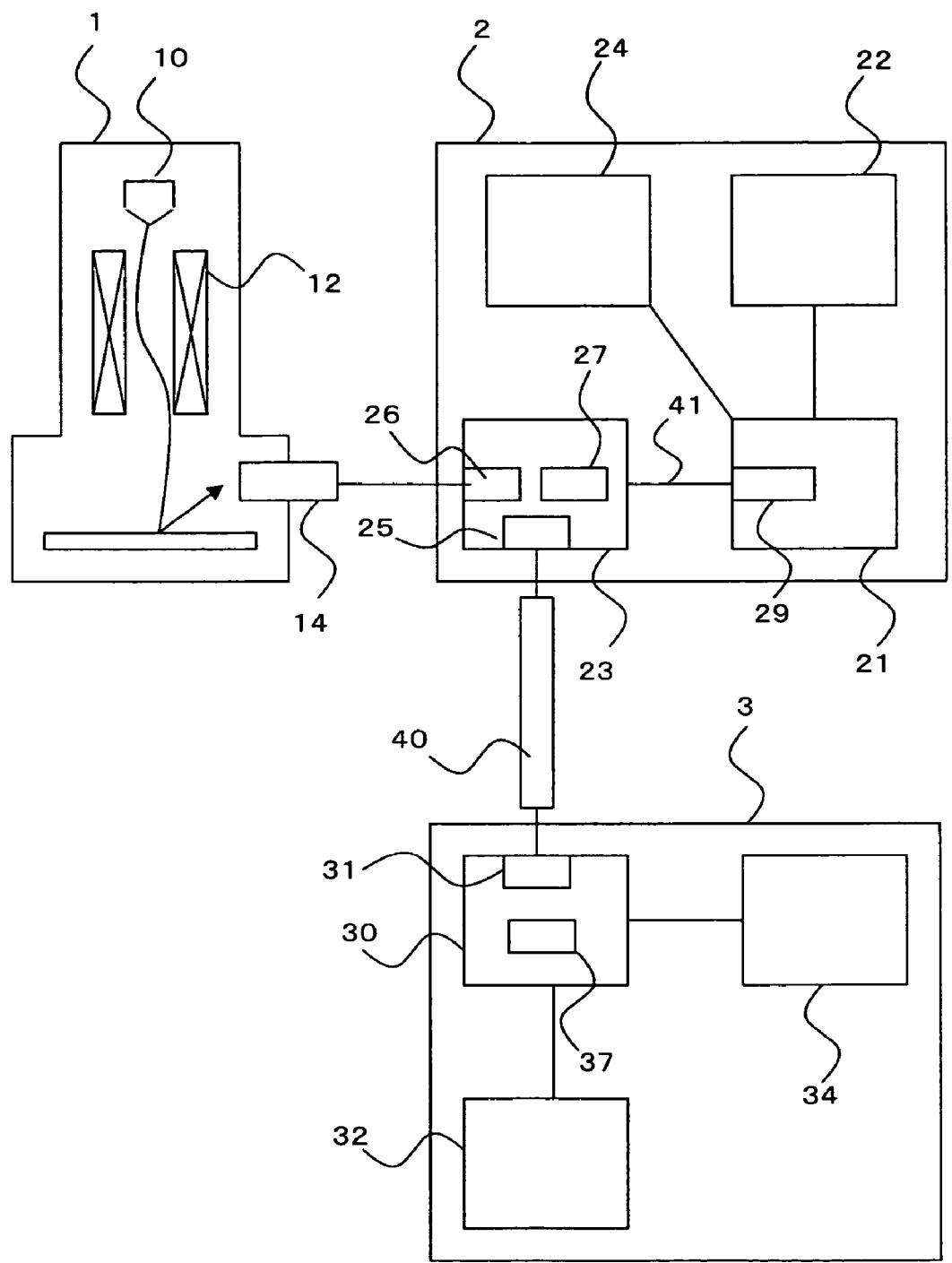
FIG. 2 shows another example of the configuration of the semiconductor inspection apparatus.

FIG. 2 is a schematic view showing another example of a configuration of the semiconductor inspection apparatus according to the present invention. The semiconductor inspection apparatus is provided with an electronic microscope body 1, a control console 2, and a remote console 3. The electronic microscope body has an electron source 10, an electronic beam deflector 12, and an electronic detector 14.

The control console 2 has two computers. An operational computer 21 is connected with a display 22, and also with an operation panel 24. An image transferring computer 23 has an image receiving function 26 for receiving a moving image which is an output of the electronic detector 14. The computer 23 has a communication function 25, and the computer 21 also has a communication function 29. The two computers are connected with each other via a communication path 41. The computer 21 receives the image, which is transmitted by the image transferring computer 23, and which displays the image on the display 22.

The remote console 3 has at least a computer. A computer 30 is connected with a display 32, and also with an operation panel 34. The computer 30 has a communication function 31. A communication path 40 makes connection between the control console 2 and the remote console 3.

By providing the image transferring computer 23 as above, a load of an image transferring processing can be reduced on the computer shown in FIG. 1.

An example described below is applicable to any semiconductor inspection apparatus schematically shown in FIG. 1 and a semiconductor inspection apparatus schematically shown in FIG. 2.

EXAMPLE 1

Figure 3:
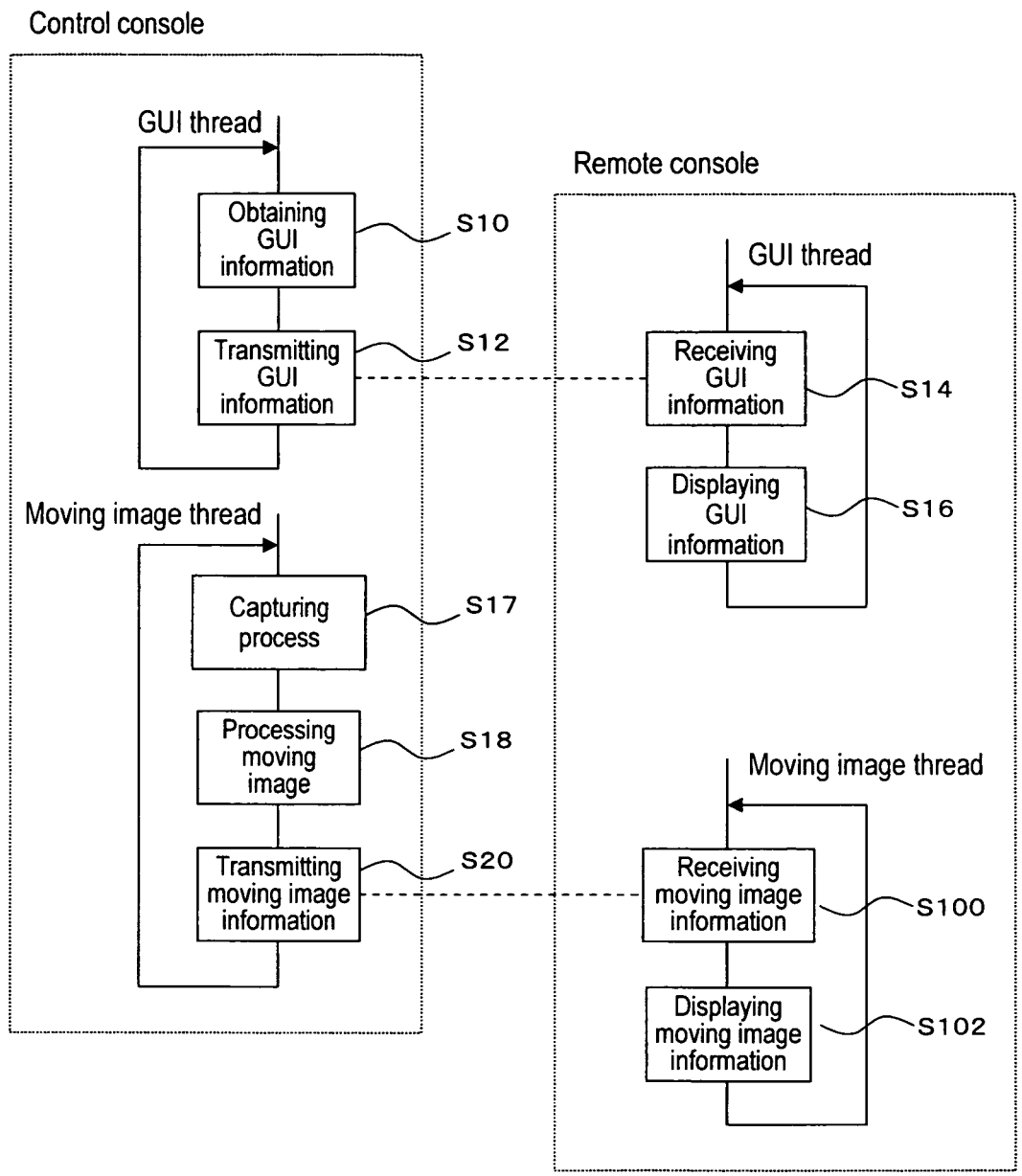

With reference to FIG. 3, an example in which graphical user interface (GUI) information and a moving image are separately dealt with is described. In the present example, implementation is carried out by two threads including a thread which processes GUI events and a thread which processes a moving image In the computer 20 of the GUI control console 2, the GUI thread obtains information on graphical user interface which has occurred on a desktop of a window system (S 10). The GUI thread transmits the obtained information via a communication path, such as Ethernet to the remote console 3 (S 12). Moreover, in the computer 20, the moving image process thread is simultaneously operated, and a moving image is captured utilizing the image receiving function 26 (S 17). The moving image thread performs the filtering, the compressing and the like, of the captured moving image (S 18). Then, the moving image thread transmits the information on moving image to the remote console 3 (S 20).

The computer 30 of the remote console 3 receives the above information on graphical user interface (S 14) to display it on the desktop of the window system (S 16). Also, the computer 30 of the remote console 3 receives (S 100) and processes information on moving image to display it on a display 32 (S 102).

The obtaining of the information on graphical user interface as shown in FIG. 3 is performed using information on graphical user interface obtaining function of the control console. The capturing process of the moving image is performed using the moving image capturing function of the control console. The processing of the moving image, such as filtering and compressing is performed using the moving image processing function. The transmission of the GUI information and the information on moving image is performed using a communication function 25. These functions in the control console can be achieved by means of software.

Not that, the information on moving image includes the moving image itself and the position, size and the like, related to the moving image. The displaying of the moving image can simply be executed as a receiving loop other than an event loop of the above described window system by using hardware overlay function. In order to achieve a discrete loop like this, a thread is utilized in general.

By separately transmitting the information on graphical user interface and the information on moving image as in the present example, deterioration of a frame rate can be avoided even when the information on graphical user interface is frequently updated.

EXAMPLE 2

Figure 4:
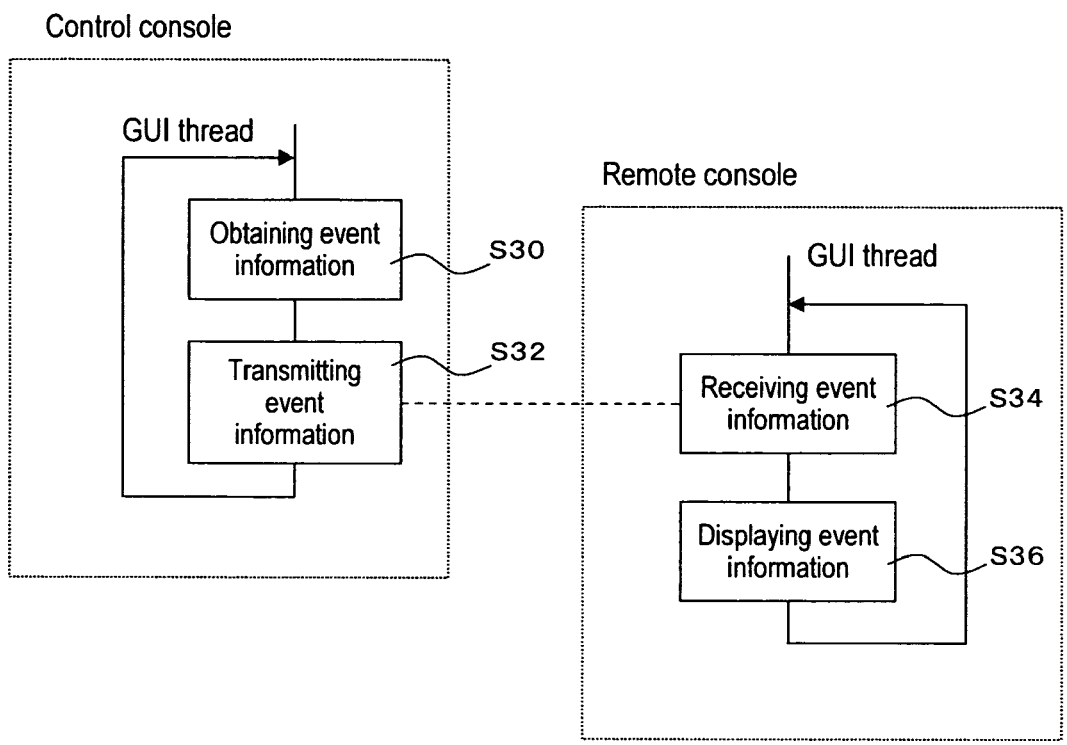
FIG. 4 shows an example in which event information is communicated.

With reference to FIG. 4, an example in which the GUI information is dealt with as the event of a higher level API is described. The event of the higher level API is event information at a widget level such as, for example,
Qt of "Qt C++ GUI Application Development Toolkit"; http://doc.trolltech.com, GTK+ of "GTK+ API Reference"; http://www.gtk.org/api/.

The computer 20 of the control console 2 obtains event of the GUI, which has occurred on the desktop of the window system (S 30). The event information, which is at the widget level, occurs due to the formation and disappearance of the window, and the operation of a button, a slider, a mouse and the like. Then, the computer 20 transmits the obtained event information of the graphical user interface to the remote console 3 (S 32). The computer 30 of the remote console 3 receives the transmitted event information (S 34). The received event information is interpreted and processed by the window system of the computer 30 of the remote console 3 to be displayed on the display 32 (S 36).

A process of obtaining the event information of the GUI shown in FIG. 4 is carried out using the GUI event information obtaining function of the control console. The transmission of the obtained GUI event information is carried out using the communication function 25. These functions in the control console can be achieved by using software.

Transmitting and receiving the event information require a small transferring volume. Therefore, the present example eliminates the need for the transfer of the large volume of bitmap data on the computer 20 of the control console 2 as in reference documents 2 and 3. Thus, a load on a network can be reduced.

EXAMPLE 3

Figure 5:
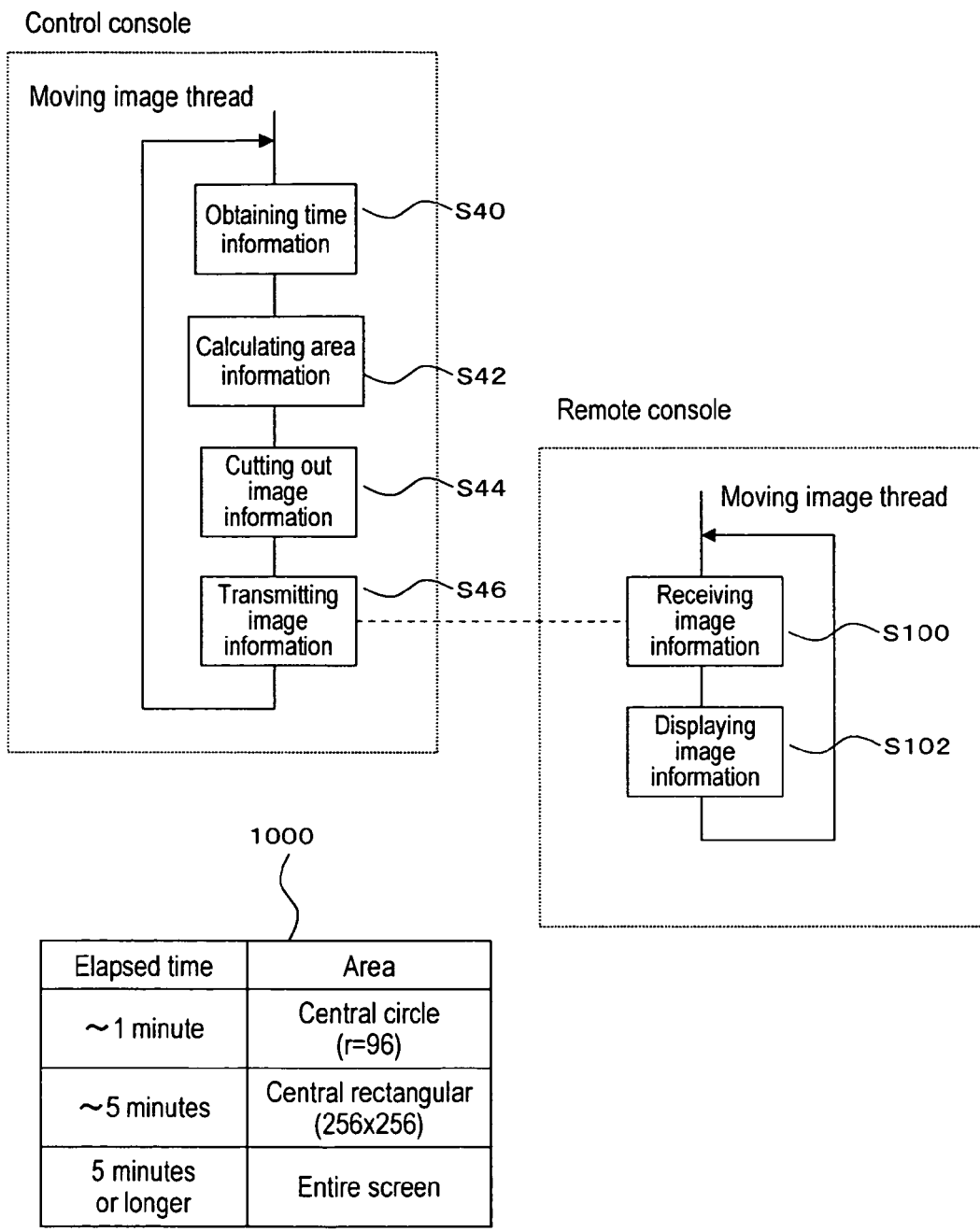
FIG. 5 is used to describe an example in which a moving image area is changed depending on a state of the apparatus.

With reference to FIG. 5, an example in which the area of the moving image is caused to change depending on the state of an apparatus is described. An example is herein shown in which a case where a given time period is elapsed from the time of power-on is used as an example of the state of the apparatus.

The computer of the control console 2 obtains the elapsed time from the power-on of the apparatus (S 40). Then, the area corresponding to the elapsed time from, for example, a table 1000 which has recorded correspondence between a time period and an area, that has been previously prepared (S 42). The image information of the calculated area is partially cut out in a circular or rectangular shape (S 44). Then, the data cut out is transferred (S 46). For example, immediately after the power is turned on, only a small rectangular area around the center is displayed. As the time is elapsed, the rectangular area is increased. Finally, when the time is so much elapsed that the apparatus is stable enough to be able to be operated, the area expanded to the entire screen is displayed.

The obtaining of the time elapsed from the time of power-on of the apparatus, shown in FIG. 5 is carried out using the timer function of the control console. The obtaining of the area corresponding to the elapsed time is carried out using the area information obtaining function of the control console with reference to the table 1000. The process of cutting out the image information in the calculated area is carried out using the image information cutting out function of the control console. These functions in the control console can be achieved by using software.

The computer 30 of the remote console 3 receives and processes information on moving image (S 100) to display it on the display 32 (S 102).

EXAMPLE 4

The inspection apparatus is equipped with several kinds of patterns of a cursor depending on an operation. The differences between noted areas respectively corresponding to the patterns of the cursor are first described with reference to FIG. 6.

A vertical cursor 100 is often used to designate a vertically arranged pattern, e.g. two wirings, for measurement of the spacing between them. Thus, a noted area A is a horizontally extending rectangle which has a horizontal length longer by several dots than the spacing between the two wirings, and a horizontal line located in the vertical center overlapping the spacing to be measured.

A horizontal cursor 101 is often used to designate a horizontally arranged pattern, e.g. two wirings, for measurement of the spacing between them. Thus, a noted area B is a vertically extending rectangle which has a vertical length longer by several dots than the spacing between the two wirings, and a vertical line located in the horizontal center overlapping the spacing to be measured.

A cross cursor 102 is often used to designate the central point of the area to be measured. Therefore, a noted area C is an area which expands by several dots around the central point A matrix cursor 103 is a combined cursor of the vertical cursor 100 and the horizontal cursor 101, and is often used to designate a circumscribed quadrangle of the area, which is to be an object for the inspection. Thus, a noted area D is an area which includes a central rectangular surrounded by the vertical cursor and the horizontal cursor, and vertically and horizontally expands by several dots from the cursors.

A box cursor 104 is often used to designate an area which includes the area to be inspected. Thus, a noted area E is an area which is designated by the box cursor 104.

A mouse cursor 105 is a rubber band box to designate a noted area by dragging. A noted area F is an area directly designated by the box during the time until finishing dragging since starting pressing a mouse button.

Dragging a mouse is often used to designate a transferring direction and distance for transferring a field of view. In a case where a moving distance of the mouse per unit of time is large, (106) is an instruction to transfer a field of view a long distance. This is used, for example, in a case where it is wanted to transfer the field of view to an adjacent area, which is not displayed on the screen. In a case where the moving distance of the mouse per unit of time is small, (107) is an instruction to transfer a field of view a short distance. This is used, for example, in a case where it is wanted to mainly transfer the field of view in and around an arbitrary area, which is displayed on a screen. In the above description, the noted area is, but not limited to, a square.

Figure 7:
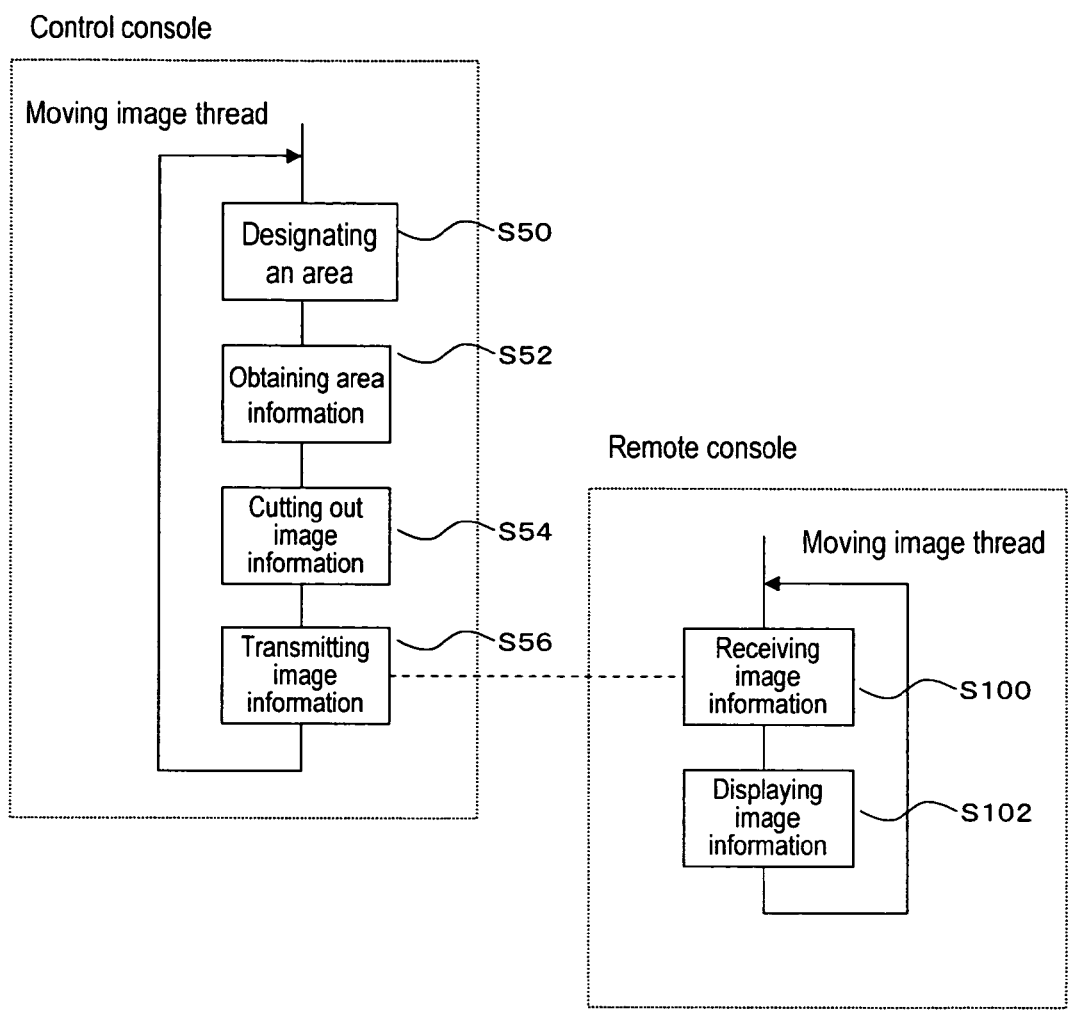
FIG. 7 is used to describe an example of designation of the moving image area depending on an operation.

With reference to FIG. 7, an example, in which an area of a moving image according to an operation is displayed, is then described. The present example is an example in which an area to be noted is designated using a mouse and the like.

Using an operation panel 24 in the control console 2, an area is set by means of an input device, specifically, a mouse and the like (S 50). Then, the moving image thread of the control console 2 obtains information about an area such as the coordinates of the noted area (S 52). The noted area is determined by a mouse cursor being used as described in FIG. 6. Then, the control console 2 partially cuts out the image information corresponding to the obtained information about area (S 54). The image information, which has been cut out, is transferred to the remote console 3 via a communication medium such as Ethernet (S 56). The remote console 3 receives a part of the information on moving image (S 100). The control console 2 displays the information on moving image in a position on the display 32, which is indicated by the information about area (S 102).

The area information obtaining function of the control console serves to carry out a process of obtaining area information as shown in FIG. 7 using received information which is received through an input device. A process of cutting out the image information is carried out using the image information cutting out function of the control console. The image information which has been cut out is transmitted using a communication function 25. These functions in the control console can be achieved by means of software.

EXAMPLE 5

Figure 8:
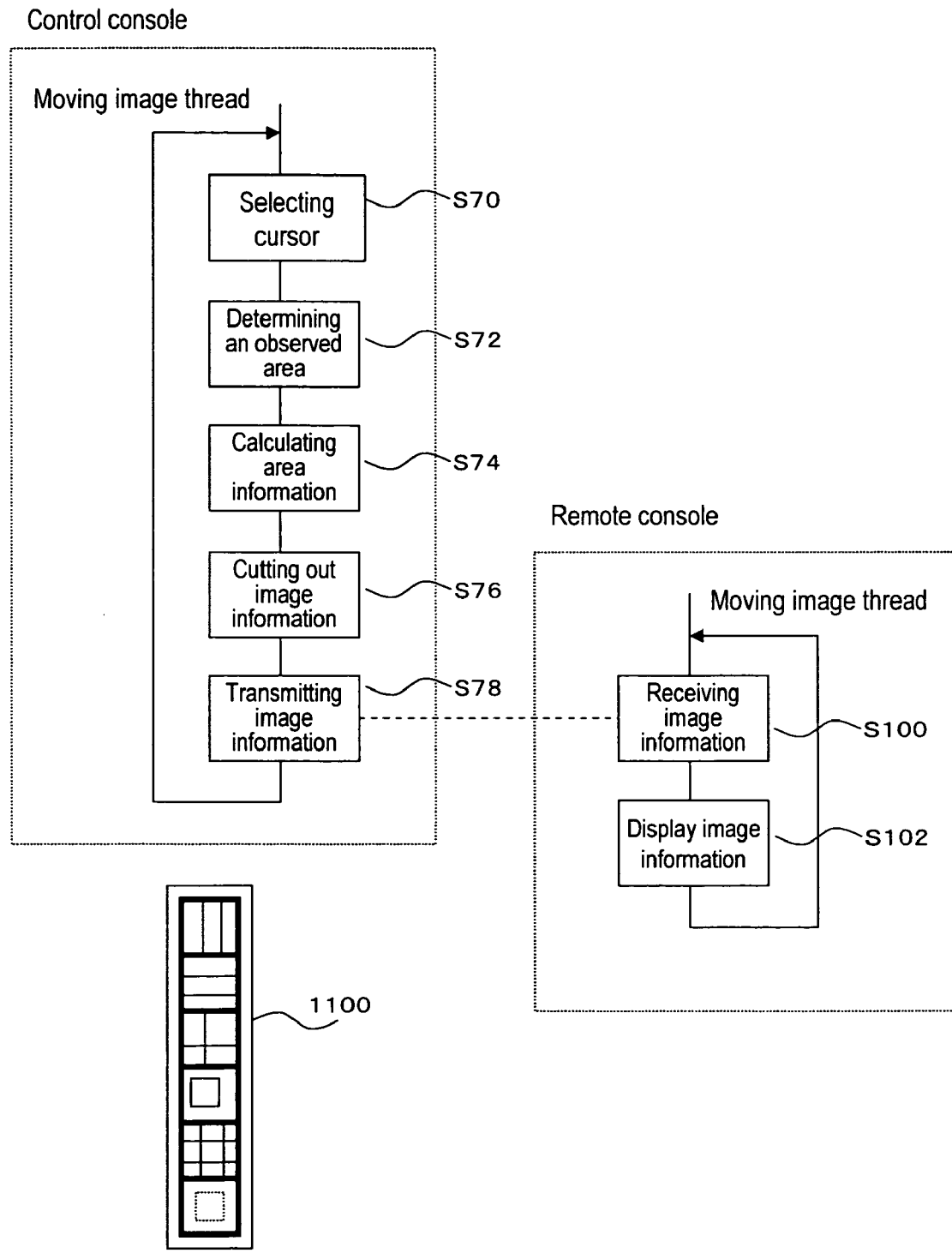
FIG. 8 is used to describe an example of the designation of the moving image area depending on the pattern of the cursor.

The inspection apparatus is equipped with several kinds of the patterns of the cursor according to operations. The area to be noted differs depending on the selected pattern of the cursor. Therefore, it is possible to obtain an area to be noted from what pattern of the cursor is selected. With reference to FIG. 8, an example in which a moving image area is designated, according to the pattern of the cursor is described.

Figure 6:
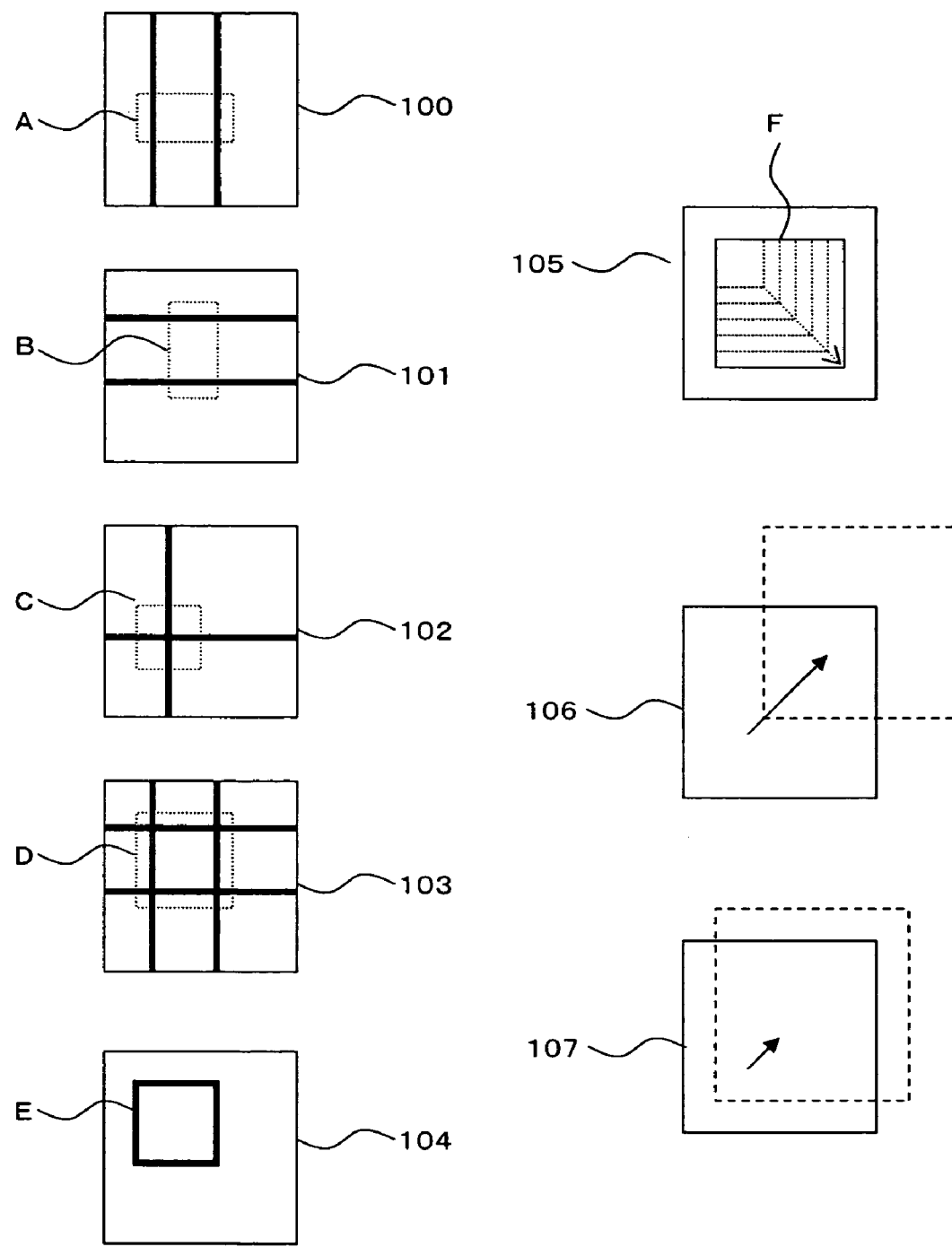
FIG. 6 is used to describe an example of correspondence between a pattern of a cursor and the moving image area.

In the present example, a cursor is selected from a group of radio buttons 1100 having an icon depicted in the pattern of the cursor on the top of each button thereof (S 70). Each button in the group of the radio buttons 1100 corresponds to each of the cursors 100 to 105 shown in FIG. 6. The selected cursor is operated to determine an observation area (S 72). The computer of the control console 2 calculates the noted areas A, B, C, D, E, and F corresponding to the selected cursor as shown in FIG. 6 (S 74). Next, the image information corresponding to the calculated area information is then partially cut out (S 76). The image information which has been cut out is then transferred via the communication medium such as Ethernet and the like (S 78). The remote console 3 receives the transferred part of the image information (S 100). Therefore, the part of the image information is displayed in the calculated position of the area information about the display 32 (S 102).

The area information calculating function of the control console serves to carry out the calculation of the noted area shown in FIG. 8 using information such as the selected kind of the pattern of the cursor, and the received observation position. A process of cutting out the image information is carried out using the image information cutting out function of the control console. The image information which has been cut out is transmitted using the communication function 25. These functions in the control console can be achieved by means of software.

EXAMPLE 6

Figure 9:
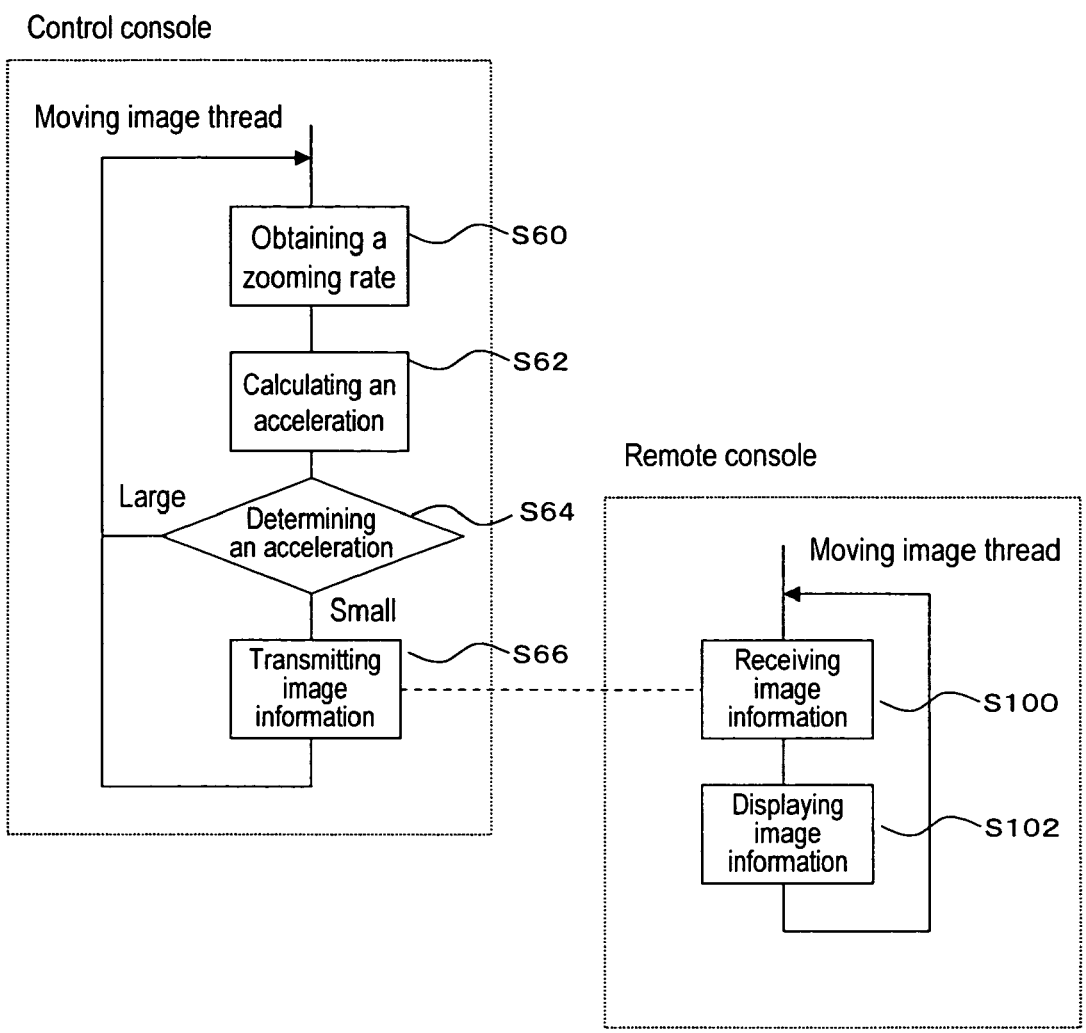
FIG. 9 is used to describe an example of the designation of the moving image area depending on a zooming operation.

With reference to FIG. 9, an example in which a moving image area is designated depending on a zooming operation is described. The present example is an example in which an image transfer is controlled depending on the acceleration of change in a zooming rate when carrying out a zooming operation.

The computer of the control console 2 obtains the zooming rate from a widget such as a slider for setting a zooming rate (S 60). Then, the acceleration of a zooming rate is calculated. The computer of the control console 2 then determines whether a transfer of the moving image is to be executed or not at the calculated acceleration (S 64). When the acceleration is small, the image information is transferred to the remote console 3 via a communication medium such as Ethernet (S 64). In this case, the remote console 3 receives a part of the image information (S 100) and displays the image information in the new noted area on the display 32 (S 102). When the acceleration is determined to be large, the control console 2 does not transfer the image information because the image is blurred during zooming.

The obtaining of the zooming rate shown in FIG. 9 is carried out using the zooming rate obtaining function of the control console. The calculation of the acceleration of the zooming rate is carried out using the function of calculating the acceleration of the zooming rate. The determination whether the calculated acceleration is either small or large is carried out using the determining function of the control console. These functions in the control console can be achieved by means of software.

EXAMPLE 7

Figure 10:
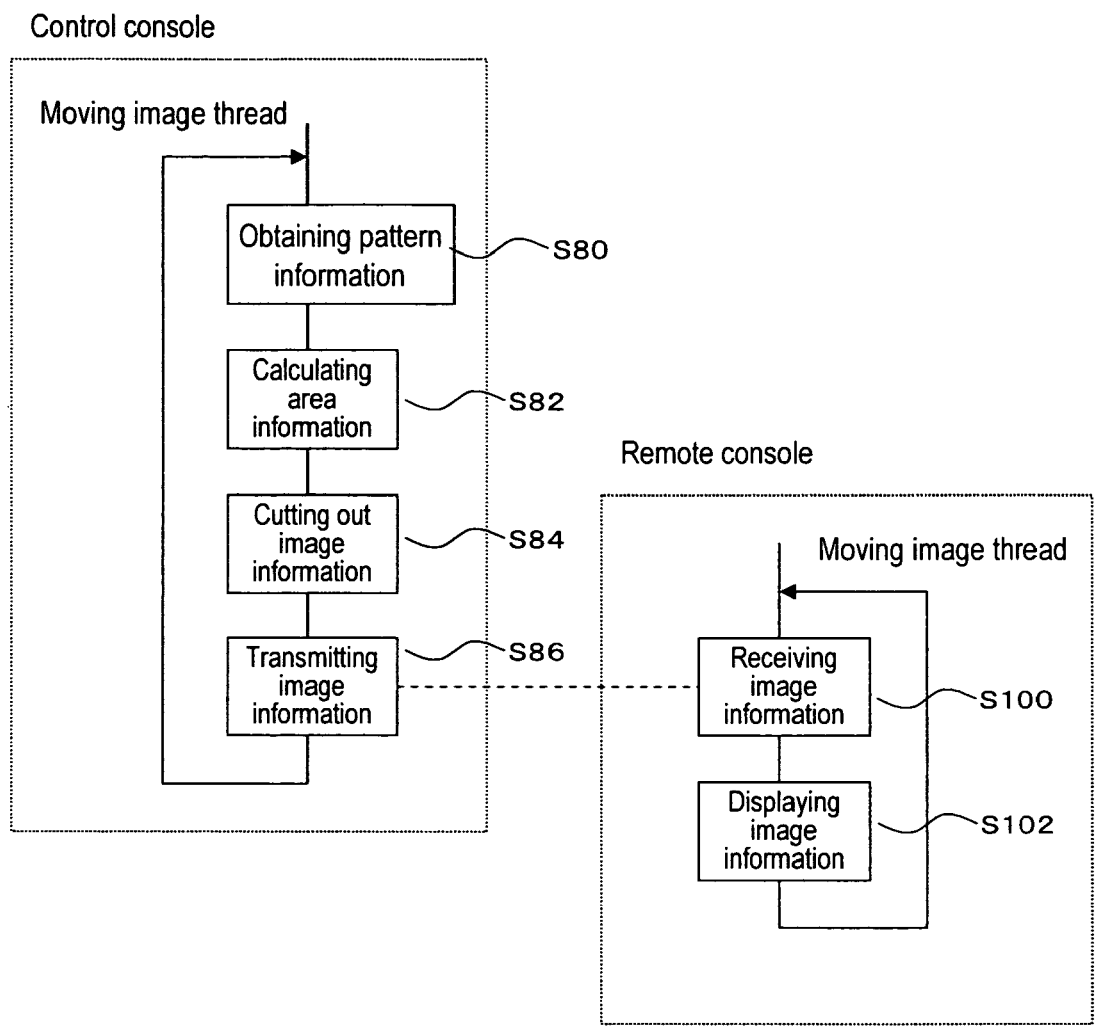
FIG. 10 is used to describe an example in which the moving image area is changed depending on the pattern.
Figure 10:
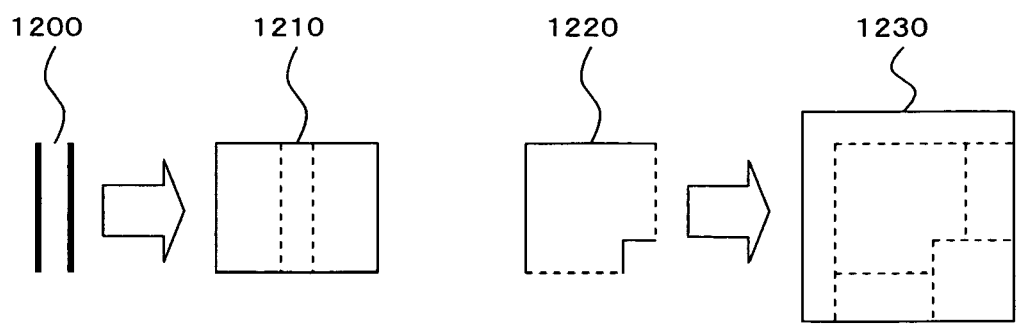

With reference to FIG. 10, an example in which the moving image area is caused to change depending on patterns is described. The semiconductor inspection apparatus includes reference patterns each called a template which is used to search for the pattern to be inspected. The present example is an example in which the noted area is caused to change depending on the pattern information of the template. In the present example, the information about the peak coordinate of the patterns and the pattern is obtained from a standard format such as GDS.

The computer of the control console 2 obtains the information about the peak coordinates and the shape of the template pattern to be used (S 80), and calculates the noted area including the pattern (S 82). For example, when the template pattern is formed by two vertical lines 1200, an area horizontally expanded by several dots is the noted area 1210 because the information about the vertical direction is not necessary to measure the distance between the lines. When the template pattern is a polygon 1220, an area which is expanded by several dots from right to left and upwardly and downwardly, and further expanded by several dots particularly to the right and downwardly to look over the whole is the noted area 1230 because there is a high possibility that a pattern extends to the right and downwardly. The computer of the control console 2 partially cut out the image information equivalent to the noted area (S 84) to transfer the cut out data to the remote console 3 via the communication media such as Ethernet (S 86). The remote console 3 receives the image information (S 100) to display the received image on the display 32 (S 100).

The obtaining of the pattern information of the template shown in FIG. 10 is carried out using the pattern information obtaining function of the control console 2. The calculation of the noted area including the pattern is carried out using the area information calculating function of the control console 2. The process of cutting out the image information is carried out using the image information cutting out function. These functions in the control console can be achieved by means of software.

EXAMPLE 8

Figure 11:
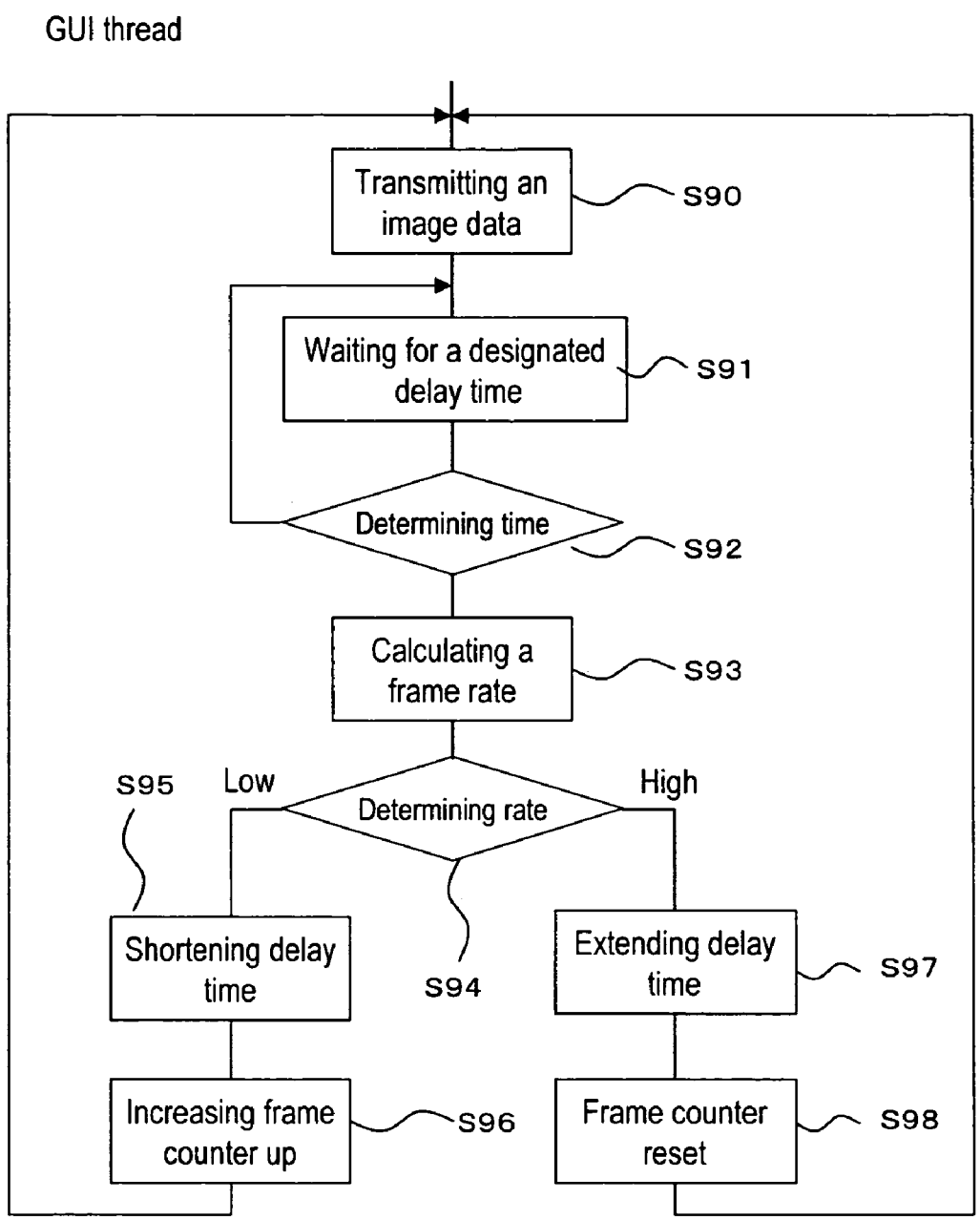
FIG. 11 is used to describe an example in which a frame rate is kept constant.

With reference to FIG. 11, an example in which a frame rate is kept constant to equalize network traffic is described.

A GUI thread transmits the image information in the control console 2 (S 90). Thereafter, the control console stands by for a set delay time (S 91). An elapsed time is determined (S 92), and if the set time has been elapsed, the frame rate is calculated (S 93). The calculated frame rate is compared with the designated frame rate (S 94), and if the calculated frame rate is smaller than the designated value, the delay time is reduced (S 95) and the frame counter is increased (S 96). If the calculated frame rate is larger than the designate value, the delay time is increased (S 97). The total number of the frames is then reset (S 98).

The processes shown in FIG. 11 are carried out using the timer function, the frame rate calculating function, and the delay time adjusting function of the control console. These functions in the control console can be achieved by means of software.

EXAMPLE 9

Figure 12:
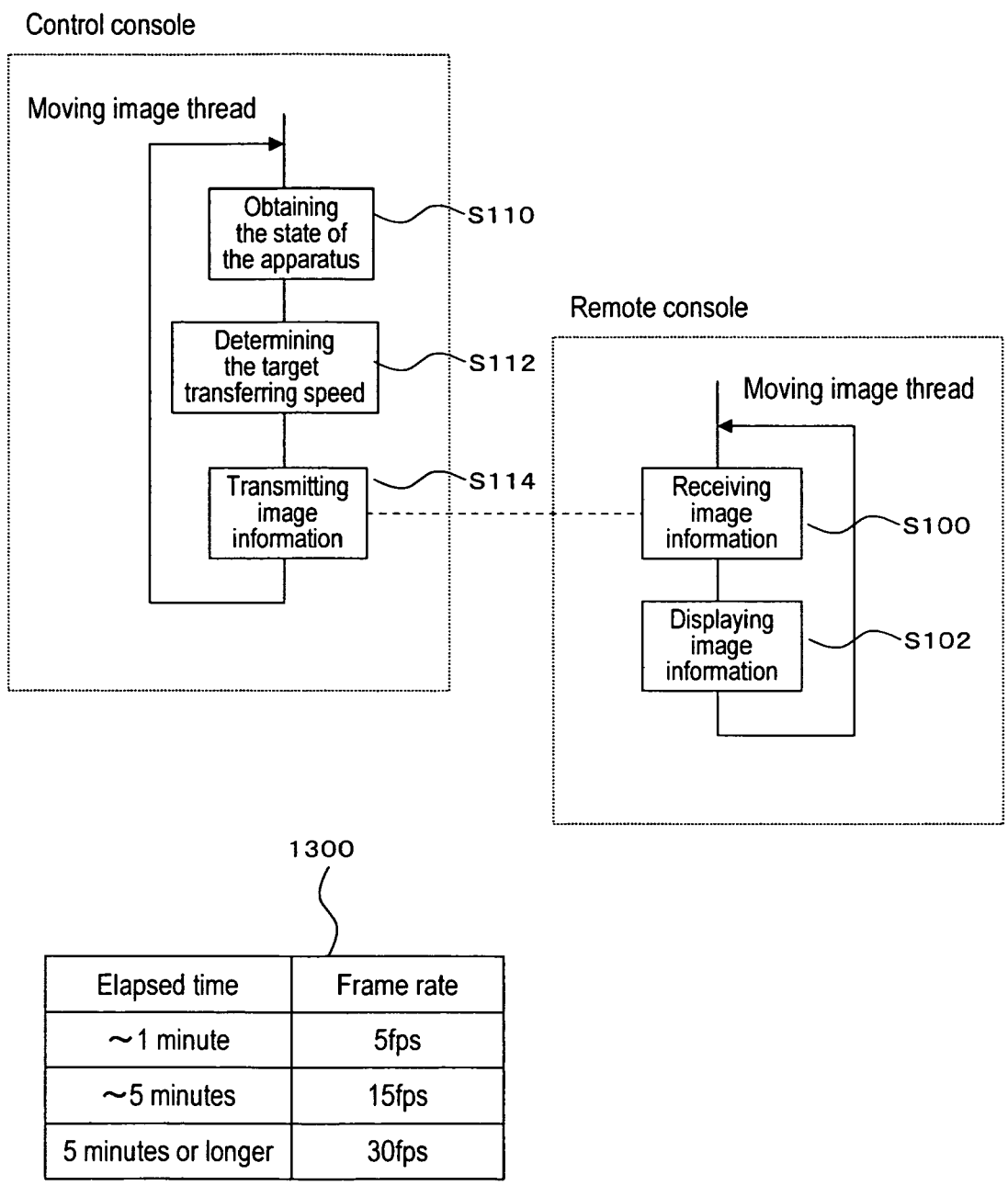
FIG. 12 is used to describe an example in which the frame rate is changed depending on the state of the apparatus.

With reference to FIG. 12, an example in which the frame rate is cause to change depending on the state of the apparatus is described.

The computer of the control console 2 obtains the state of the apparatus (S 110). The state of the apparatus refers to, for example, time period elapsed since power is turned on for the apparatus, a change in the mode of the apparatus and the like. Then, a target transfer speed corresponding to the obtained state of the apparatus is then obtained (S 112). For example, the frame rate is set to 5 fps for 1 minute immediately after the power of the apparatus is turned on. The apparatus becomes stable as a time goes by, and thus the frame rate is gradually increased to 15 fps, and then, to 30 fps. This can be achieved by preparing a table 1300 showing the relationship between an elapsed time and a frame rate. The control console 2 transfers the data at the obtained target frame rate (S 114). The remote console 3 receives the image information (S 100) to display the received image information on the display 32 (S 102).

A process of obtaining the state of the apparatus shown in FIG. 12 is carried out using the apparatus state obtaining function of the control console. The target transfer speed obtaining function of the control console serves to carry out a process of obtaining the target transfer speed with reference to the table and the like. These functions in the control console can be achieved by means of software.

EXAMPLE 10

Figure 13:
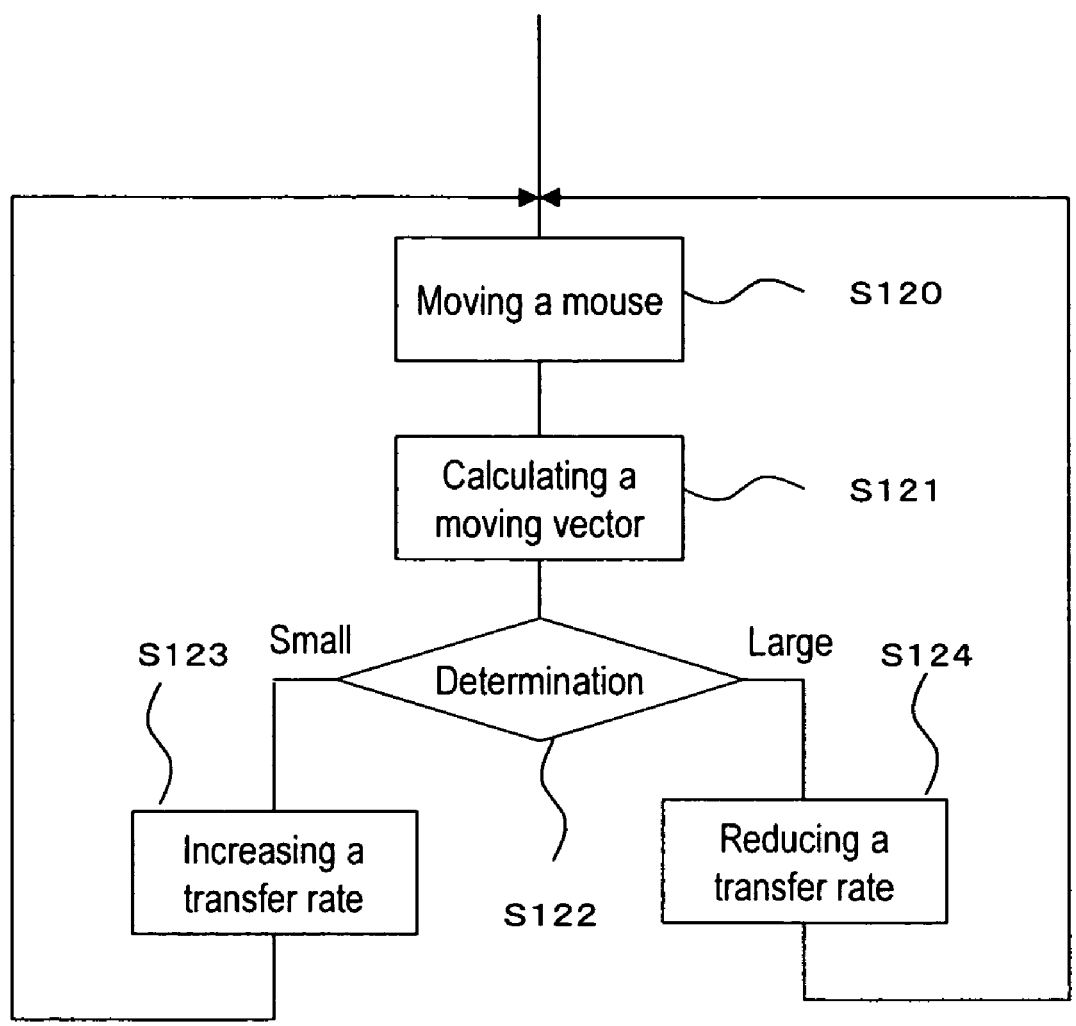
FIG. 13 is used to describe an example in which the frame rate is changed depending on the operation.

With reference to FIG. 13, an example in which the frame rate is cause to change depending on the operations is described. Here, an example in which the frame rate is caused to change by operation of moving the noted area is described.

As shown in 106 and 107 of FIG. 6, a field of view is transferred by moving a mouse (S 120). The computer of the control console 2 calculates the moving vector from the moving of the mouse (S 121). Then, the magnitude of the vector is compared with the predetermined threshold value (S 122). When the moving vector is small, a field of view is transferred a short distance. Therefore, it is often desired that a new area be located in the moving direction is observed in detail. Thus, when the amount of vector is small, a transfer speed is increased and the data is transmitted in detail to increase the frame rate (S 123). On the contrary, when the moving vector is large, a field of view is quickly transferred. Therefore, it is not necessary to display the area which is being transferred in detail. Preferably, the field of view after being transferred should soon be displayed. Therefore, when the amount of vector is large, the transfer speed is reduced, and a thinned data is transmitted to reduce the frame rate (S 124).

A process of calculating the moving vector from the moving of the mouse shown in FIG. 13 is carried out using the moving vector calculating function of the control console 2. The determination whether the calculated moving vector is small or large is carried out using the determining function of the control console. A process of increasing or decreasing the transfer rate is carried out using the transfer rate adjusting function of the control console. These functions in the control console can be achieved by means of software.

EXAMPLE 11

Figure 14:
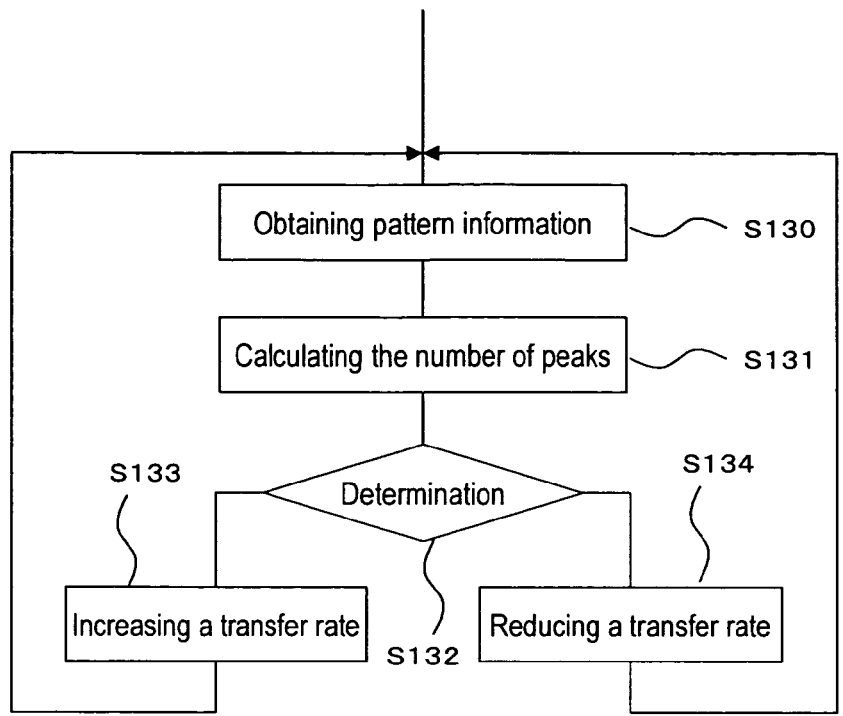
FIG. 14 is used to describe an example in which the frame rate is changed depending on complexity of the pattern.

With reference to FIG. 14, an example in which the frame rate is caused to change depending on the complexity of the designated pattern is described. In this example, the complexity of the pattern is represented by the number of the peaks of the pattern for description.

The computer of the control console obtains the information about the pattern to be inspected (S 130). The pattern information herein refers to a set of vector data including the peak information specified by a format such as GDS and the like. Then, the computer of the control console calculates the number of the peaks of the pattern (S 131). Next, a determination is then made whether or not the calculated number of the peaks is larger than the predetermined threshold value (S 132). When the number of the peaks is larger, the transfer speed is increased, and the data is transmitted in detail to increase the frame rate (S 133). On the contrary, when the number of the peaks is smaller, the transfer speed is reduced, and the thinned data is transmitted to reduce the frame rate (S 134). A determination whether the number of the peaks of the pattern is small or large is different depending on the process or the pattern.

A process of obtaining the information about the pattern to be inspected shown in FIG. 14 is carried out using the pattern information obtaining function of the control console. The calculation of the number of the peaks of the pattern is carried out using the function of calculating the number of the peaks of the pattern. A determination whether the calculated number of the peaks of the pattern is small or large is carried out using the determining function of the control console. A process of increasing or decreasing the transfer rate is carried out using the transfer rate adjusting function of the control console. These functions in the control console can be achieved by means of software.

EXAMPLE 12

Figure 15:
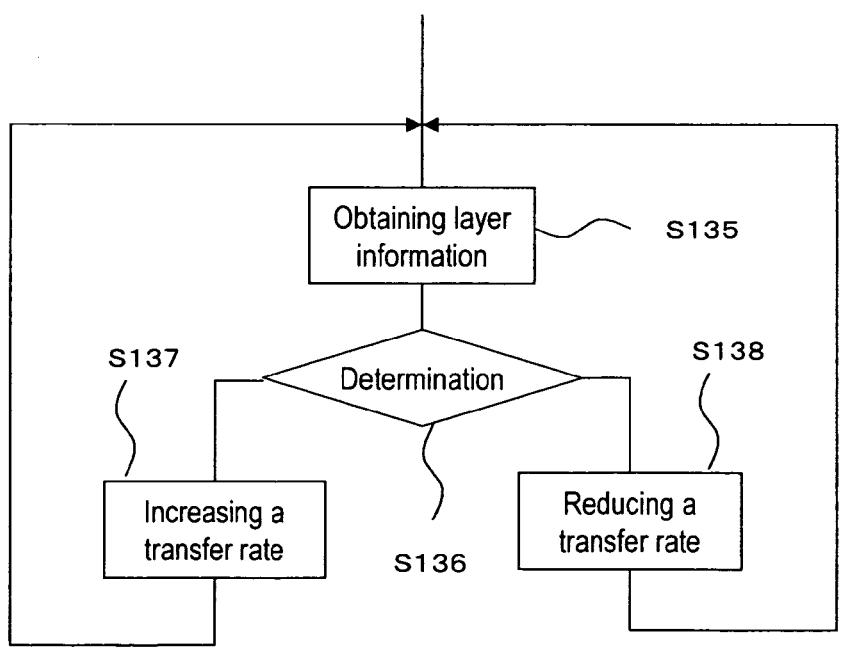
FIG. 15 is used to describe an example in which the frame rate is changed depending on a layer of the pattern.

With reference to FIG. 15, an example in which the frame rate is caused to change depending on the layer of the designated pattern is described.

The computer of the control console 2 obtains the layer information of the pattern (S 135). The layer information of the pattern can be obtained by referring a data base such as, for example, "OpenAccess"; http://www.si2.org/index.html?openaccess/index.html. Then, the layer information is determined (S 136). The judgment is classified by, for example, the role of each layer. When the pattern is a gate layer, it has a high fineness and serves an important role, thus the frame rate being increased (S 137). When the pattern is a metallic wiring layer, it has a low fineness, thus the frame rate being decreased (S 138).

A process of obtaining the layer information shown in FIG. 15 is carried out using the layer information obtaining function of the control console. A determination of the layer information is carried out using the determining function of the control console. A process of increasing or decreasing the transfer rate is carried out using the transfer rate adjusting function of the control console in cooperation with the determining function. These functions in the control console can be achieved by means of software.

EXAMPLE 13

Figure 16:
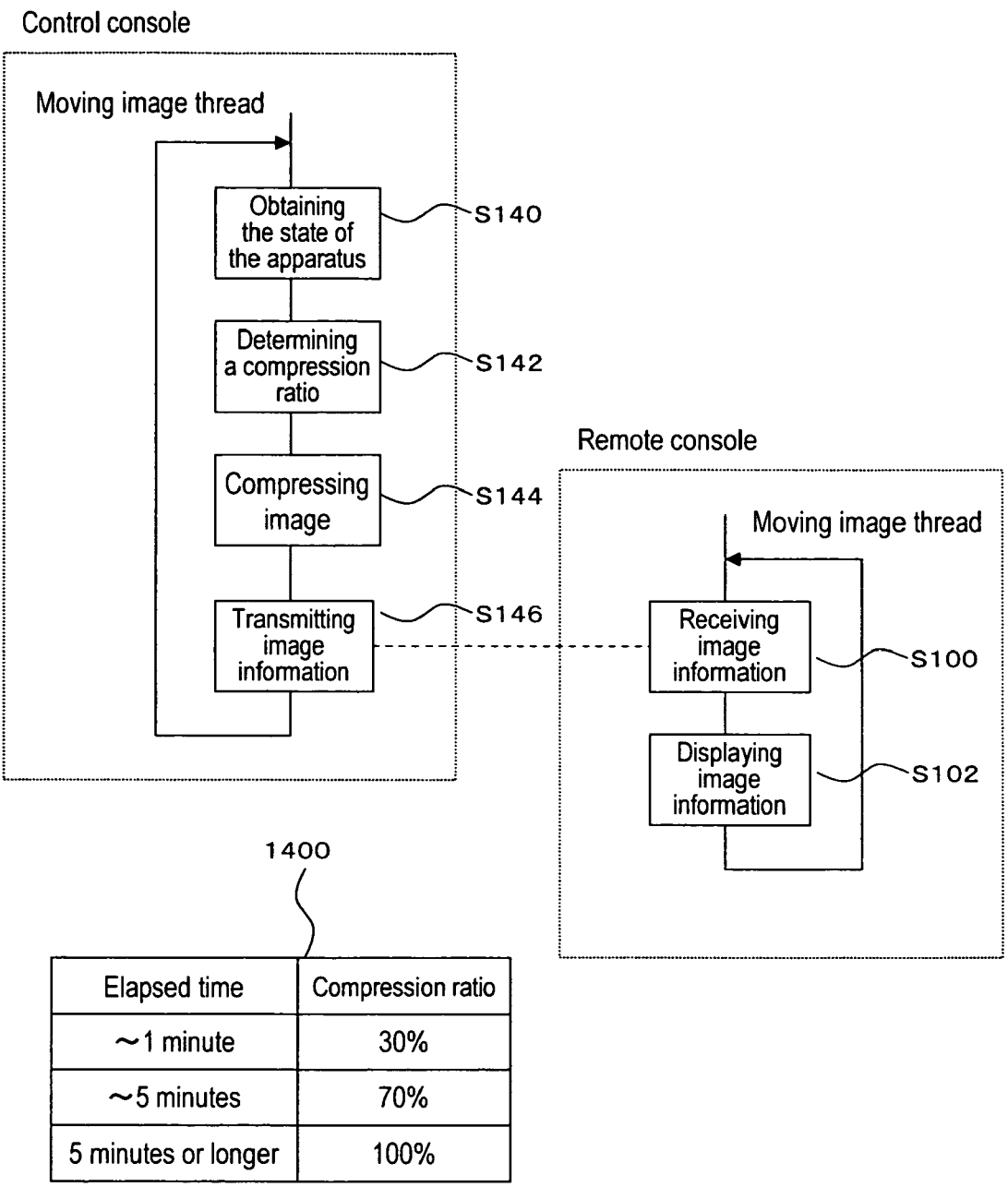
FIG. 16 is used to describe an example in which a compression ratio is changed depending on the state of the apparatus.

With reference to FIG. 16, an example in which a compression ratio is caused to change depending on the state of the apparatus is described. Here, an example in which the compression ratio is caused to change depending on an elapsed time since the power is turned on is described.

The computer of the control console 2 obtains an elapsed time since the power is turned on as a state of the apparatus (S 140). Then, the compression ratio corresponding to the obtained elapsed time is determined (S 142). The compression ratio corresponding to an elapsed time is previously stored in a table 1400. The compression ratio can be determined by referring this table. For example, at the time of the start-up of the apparatus, the apparatus is yet stable, and thus generates such a large amount of noise that it is highly possible for the image quality to be deteriorated. Therefore, since deterioration of the image quality is not a problem, the image information is compressed at a high compression ratio to reduce a transferred volume. When the apparatus becomes stable and able to operate, the compression ratio is reduced because high image quality is required for measurement. The computer of the control console 2 compresses the data at the target compression/decompression ratio (S 144) to transmit the image information to the remote console 3 (S 146). The remote console 3 receives the compressed image information (S 100), and decompresses the information to display the information on the display 32 (S 102).

A process of obtaining the state of the apparatus shown in FIG. 16 is carried out using the apparatus state obtaining function of the control console. A determination of the compression ratio is carried out using the compression ratio determining function of the control console with reference to the table and the like. A process of compressing the image is carried out using the moving image processing function 27 of the control console. These functions in the control console can be achieved by means of software.

EXAMPLE 14

Figure 17:
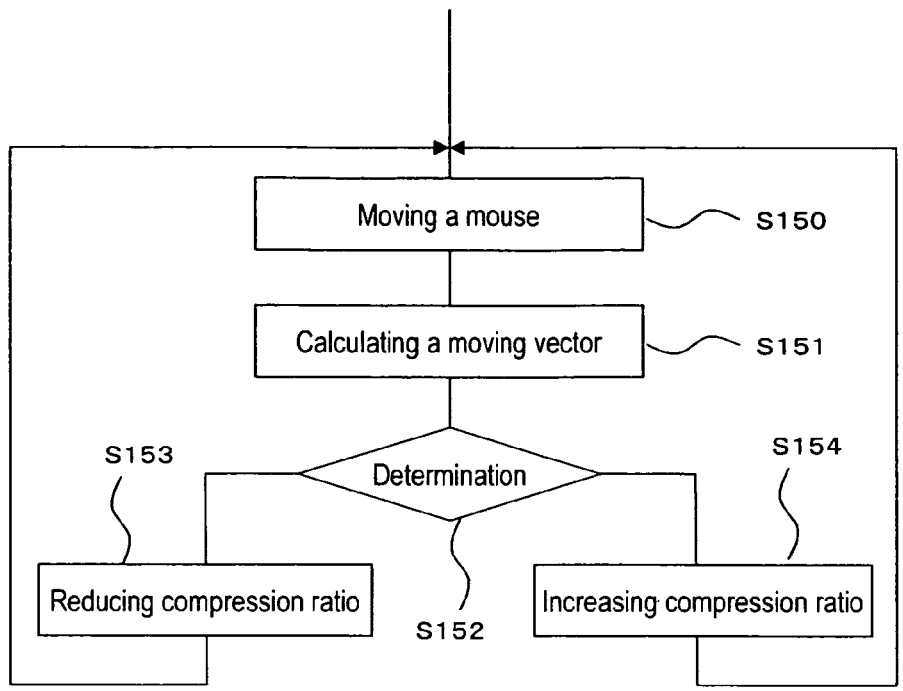
FIG. 17 is used to describe an example in which the compression ratio is changed depending on the operation.

With reference to FIG. 17, an example in which the compression ratio is caused to change depending on user's operations is described. Here, the variation in the compression ratio corresponding to the transferring operation of an observation field of view is described.

A user transfers his or her field of view according to the moving of the mouse as shown in 106 and 107 of FIG. 6. The computer of the control console 2 detects the moving of the mouse (S 150) to calculate a vector in the moving direction (S 151). Then, a judgment is made whether or not the size of the moving vector is larger than the predetermined value (S 152). When the vector in the moving direction is smaller, the field of view is transferred a short distance. Thus, it is therefore often desired that a new area in the moving direction be observed in detail. Accordingly, when the amount of the vector is small, the compression ratio is reduced to place priority on the image quality (S 153). On the contrary, when the vector in the moving direction is large, the images are exchanged with each other over a wide range. Thus, since it is not necessary to display in detail the area which is being moved, the field of view after being transferred should soon be displayed. Accordingly, when the amount of the vector is large, the compression ratio is increased to place priority on the reduction in the transferred amount (S 154).

A process of calculating the moving vector from the moving of the mouse shown in FIG. 17 is carried out using the moving vector calculating function of the control console. A determination is made whether the calculated moving vector is small or large using the determining function of the control console. A process of increasing or reducing the compression ratio is carried out using the moving image processing function 27 of the control console in cooperation with the determining function. These functions in the control console can be achieved by means of software.

EXAMPLE 15

Figure 18:
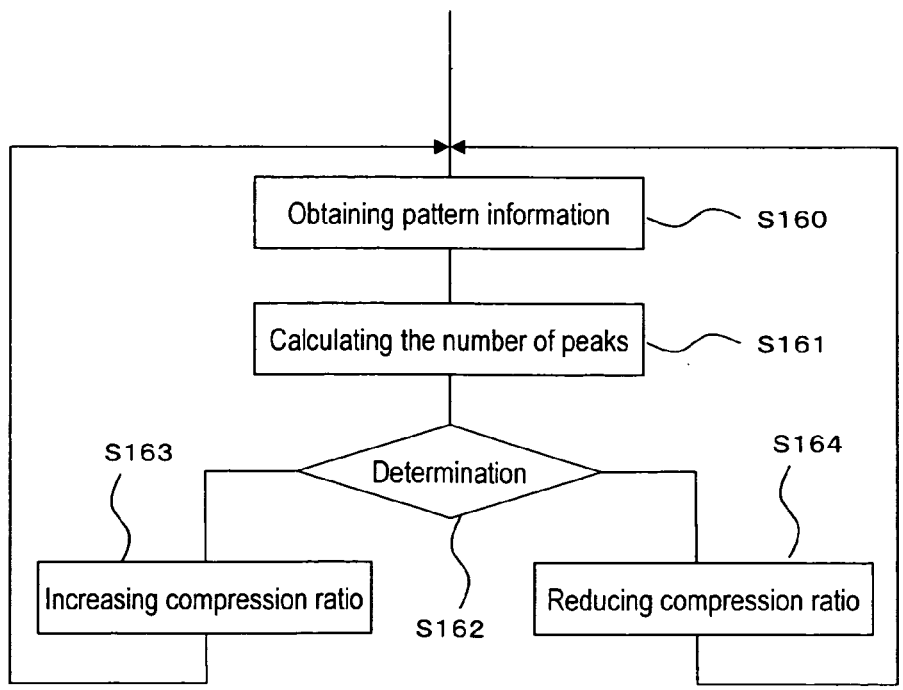
FIG. 18 is used to describe an example in which the compression ratio is changed depending on pattern information.

With reference to FIG. 18, an example in which the compression ratio is caused to change depending on the pattern information is described. Here, an example in which the compression ratio is caused to change depending on the complexity of the designated pattern is described. The complexity of the pattern is considered to be represented by the number of the peaks of the pattern.

The computer of the control console 2 obtains the information about the pattern (S 160). The information about the pattern can be obtained from the data base as in Example 12. Then, the number of the peaks of the pattern is calculated (S 161) to determine whether or not the number of the peaks is larger than the predetermined threshold (S 162). When the number of the peaks is larger, the compression ratio is reduced for transmission to avoid the deterioration of the image quality of the peak area (S 163). On the contrary, when the number of the peaks is smaller, the compression ratio is increased for transmission because the compression has a little deterioration effect on the image quality (S 164).

A process of obtaining the information about the pattern to be inspected shown in FIG. 18 is carried out using the pattern information obtaining function of the control console. The calculation of the number of the peaks of the pattern is carried out using the function of calculating the number of the peaks of the pattern. A determination whether the number of the peaks is small or large is made using the determining function of the control console. A process of increasing or reducing the compression ratio is carried out using the moving image processing function 27 of the control console in cooperation with the determining function. These functions in the control console can be achieved by means of software.

EXAMPLE 16

Figure 19:
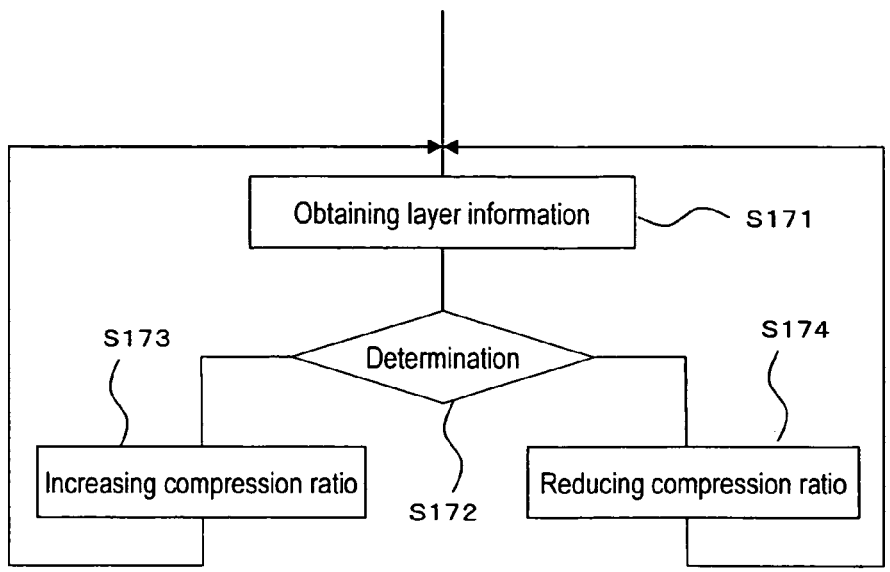
FIG. 19 is used to describe an example in which the compression ratio is changed depending on the layer of the pattern.

With reference to FIG. 19, an example in which the compression/decompression ratio is caused to change depending on the layer of the designated pattern is described.

The computer of the control console 2 obtains the layer information of the pattern (S 171). The layer information can be obtained from the data base as in Example 12. Then, the kind of layer information is determined (S 172). For example, when the pattern is a gate layer, it has a high fineness and serves an important role. Therefore, the compression/decompression ratio is reduced to avoid the image quality from being deteriorated (S 174). When the pattern is a metallic wiring layer, which has a low fineness, the compression/decompression ratio is increased (S 173).

A process of obtaining the layer information shown in FIG. 19 is carried out using the layer information obtaining function of the control console. The determination of the kind of the layer information is carried out using the determining function of the control console. A process of increasing or reducing the compression ratio is carried out using the moving image processing function 27 of the control console in cooperation with the determining function. These functions in the control console can be achieved by means of software.

EXAMPLE 17

Figure 20:
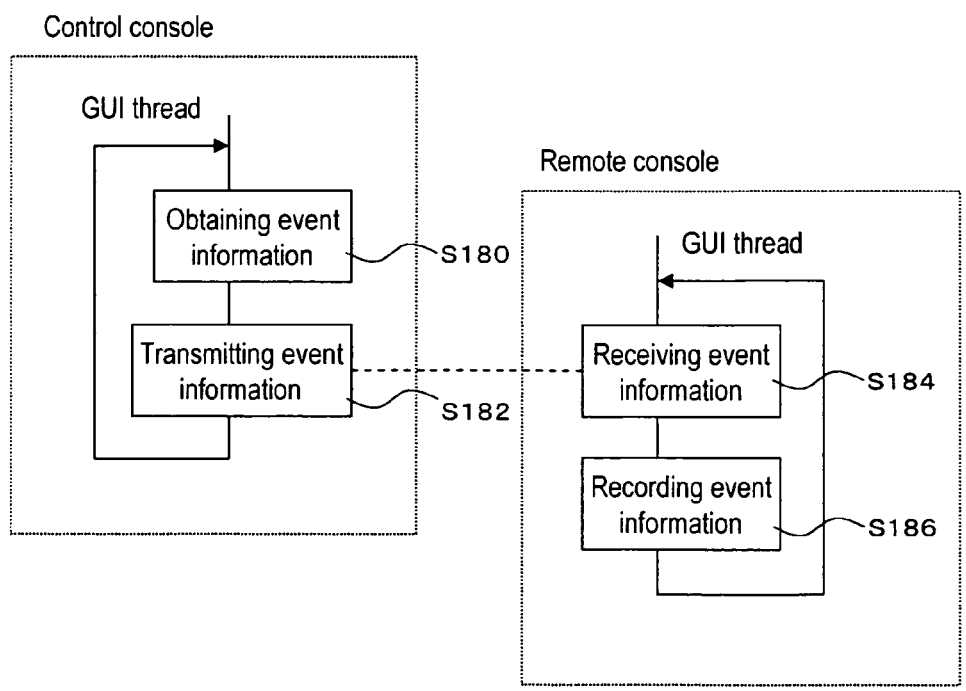
FIG. 20 is used to describe an example in which the operation is recorded in a log

With reference to FIG. 20, an example in which the operations are recorded in a log is described. The computer of the control console 2 or the computer of the remote console 3 obtains events of the graphical user interface, which is generated on the desktop of the window system (S 180). The event information refers to event information at a widget level, including, for example, Qt of "Qt C++ GUI Application Development Toolkit"; http://doc.trolltech.com, and GTK+ of "GTK+ API Reference"; http://www.gtk.org/api/, and to the information which is generated by the operations such as formation or disappearance of a window, a click of a button, the moving of a slider, the moving of a mouse, and key input. The event information of the graphical user interface is transmitted via a communication medium such as Ethernet and the like (S 182). The computer for the log receives the transmitted event information (S 184), and records the received event information in the log (s 186).

A process of obtaining the event information of the GUI shown in FIG. 20 is carried out using the GUI event information obtaining function of the control console. The transmission of the obtained GUI event information is carried out using the communication function 25. These functions in the control console can be achieved by means of software.

Note that, it is possible that the computer of the control console 2 or the computer of the remote console 3 concurrently serves as a computer for a log. Alternatively, another computer may be provided to be exclusively used for the log. Such a computer for a log integrally records the event information of the graphical user interface, the state of the apparatus, and an error log, and the computer makes it easy to analyze what operation by an operator causes an apparatus to be operated. Accordingly, analyzing what operation by an operator has caused the apparatus to be operated is facilitated.

EXAMPLE 18

Figure 21:
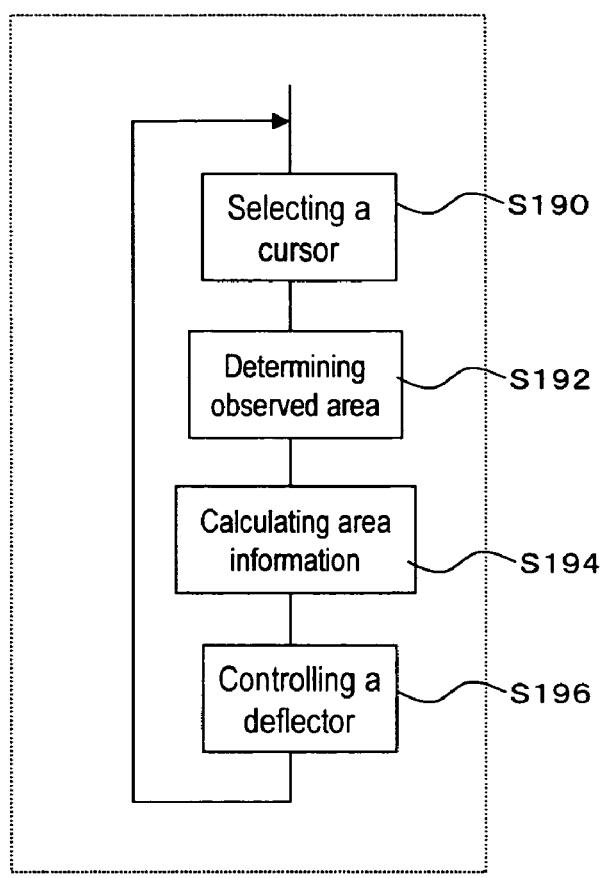
FIG. 21 is used to describe an example in which an electronic beams irradiation area is limited depending on the operation.
Figure 21:
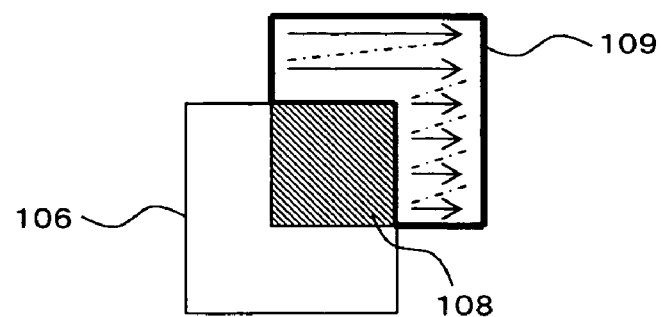

With reference to FIG. 21, an example in which an electronic beam irradiation area is limited depending on the operation by a user is described. The present example is an example in which damage to an object to be inspected, such as a wafer and the like, is reduced by changing the electronic beam irradiation area depending on the pattern of a cursor.

The inspection apparatus is equipped with a plurality of patterns of the cursor shown in FIG. 6. The noted area is changed depending on the pattern of the cursor. The computer of the control console 2 first detects selection of the pattern of the cursor (S 190), then the observed position is determined by operating the cursor (S 192). Then, the noted area corresponding to the selected cursor is calculated (S 194). When using as an example the transfer of a field of view 106 of FIG. 6 by dragging a mouse, in an overlapped area 108 between before and after moving, the current image can be used. The new field of view after moving is a polygonal area 109. Therefore, it is only necessary to irradiate electronic beams only on the polygonal area 109 to obtain an image. There is actually a return of the scanning of the electronic beams, so the margin of the return should be taken into consideration.

The control console 2 controls the electronic beam deflector 12 of the electronic microscope body 1 so that the area equivalent to the information about the calculated area is scanned (S 196). The electronic beam irradiation area is limited by controlling the electronic beams in this manner, and thereby resulting in the reduction in the damaged area of the semiconductor to be inspected.

The area information calculating function of the control console serves to carry out the calculation of the area information shown in FIG. 21 using information about the kind of the selected cursor and information about the received observed area.

What is claimed is:

1. A semiconductor inspection apparatus comprising:
    an electronic beam device which comprises an electron source, an electronic beam deflector and an electronic detector, and which detects a sample signal by scanning a sample with electronic beams; and
    a control console which comprises a display displaying an operation screen of the electronic beam device and an image of an object to be inspected, an operation panel, and a communication interface for communicating with a remote console, the control console forming the image from the sample signal outputted from the electronic beam device to display the image on the display, and the control console controlling the electronic beam device through an operation of the operation screen using the operation panel,
    wherein said control console separates information on the operation screen and information on the image from each other to communicate the separated pieces of information between itself and the remote console, and the control console controls the moving image area to be sent, the delay time, or the compression rate according to information regarding the sample or the apparatus at the time of image acquisition.

2. The semiconductor inspection apparatus according to claim 1,
    wherein an area of the image to be transmitted is changed depending on a state of the semiconductor inspection apparatus.

3. The semiconductor inspection apparatus according to claim 1,
    wherein an area of the image to be transmitted is changed depending on an operation by an operator.

4. The semiconductor inspection apparatus according to claim 1,
    wherein an area of the image to be transmitted is changed depending on the pattern information on an area to be inspected.

* * * * *